(12) United States Patent
Toda (10) Patent No.: US 9,011,018 B2
(45) Date of Patent: Apr. 21, 2015

(54) ROLLER BEARING

(71) Applicant: Kohei Toda, Mie (JP)

(72) Inventor: Kohei Toda, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/361,316

(22) PCT Filed: Nov. 19, 2012

(86) PCT No.: PCT/JP2012/079933
§ 371 (c)(1),
(2) Date: May 29, 2014

(87) PCT Pub. No.: WO2013/080824
PCT Pub. Date: Jun. 6, 2013

(65) Prior Publication Data
US 2014/0328554 A1    Nov. 6, 2014

(30) Foreign Application Priority Data

Dec. 2, 2011    (JP) ................................. 2011-264529

(51) Int. Cl.
| F16C 19/36 | (2006.01) |
| F16C 33/58 | (2006.01) |
| F16C 33/34 | (2006.01) |
| F16C 33/66 | (2006.01) |

(52) U.S. Cl.
CPC ................ *F16C 19/36* (2013.01); *F16C 33/34* (2013.01); *F16C 33/664* (2013.01); *F16C 33/585* (2013.01); *F16C 33/586* (2013.01)

(58) Field of Classification Search
CPC .......... F16C 19/26; F16C 33/34; F16C 33/58; F16C 33/605; F16C 2240/34; F16C 2240/50; F16C 23/088

USPC ........ 384/450, 548, 564, 568, 569, 615, 618, 384/621
See application file for complete search history.

(56) References Cited

U.S. PATENT DOCUMENTS

| 3,350,147 | A | * | 10/1967 | Hingley | ........................ 384/472 |
| 3,963,285 | A | * | 6/1976 | Kellstrom | ..................... 384/450 |
| 4,027,930 | A | * | 6/1977 | Bodensieck | .................. 384/556 |
| 4,318,574 | A | * | 3/1982 | Nakamura | .................... 384/564 |
| 6,702,471 | B2 | * | 3/2004 | Sakoda et al. | ................ 384/450 |

(Continued)

FOREIGN PATENT DOCUMENTS

| GB | 1374098 | A | * | 11/1974 | ............. F16C 19/26 |
| JP | 52-079156 | | | 7/1977 | |

(Continued)

OTHER PUBLICATIONS

International Search Report issued Dec. 18, 2012 in International (PCT) Application No. PCT/JP2012/079933.

(Continued)

*Primary Examiner* — Marcus Charles
(74) *Attorney, Agent, or Firm* — Wenderoth, Lind & Ponack, L.L.P.

(57) ABSTRACT

A roller bearing of the type having a flange on which thrust loads are received shows improved ability to form an oil film at the contact surface portions of the end surface of a roller and the flange. The contact surface portions are both inclined at an angle of not less than 0.1° and not more than 1.5° with respect to the radial direction, over the entire circumferences of the respective contact surface portions.

9 Claims, 7 Drawing Sheets

(56) References Cited

U.S. PATENT DOCUMENTS

| | | | |
|---|---|---|---|
| 6,767,134 B2 * | 7/2004 | Murai et al. | 384/568 |
| 6,997,617 B2 * | 2/2006 | Ide et al. | 384/569 |
| 7,416,346 B2 * | 8/2008 | Takemura et al. | 384/568 |

FOREIGN PATENT DOCUMENTS

| | | | |
|---|---|---|---|
| JP | 59-106719 | 6/1984 | |
| JP | 07-012119 | 1/1995 | |
| JP | 2000-304038 | 10/2000 | |
| JP | 2002-195272 | 7/2002 | |
| JP | 2011-163454 | 8/2011 | |
| RU | 2199039 C2 * | 2/2003 | F16C 19/26 |

OTHER PUBLICATIONS

Written Opinion of the International Searching Authority issued Dec. 18, 2012 in International (PCT) Application No. PCT/JP2012/079933 (with English translation).

* cited by examiner

ROLLER BEARING

TECHNICAL FIELD

This invention relates to a roller bearing including flanges which can receive thrust loads.

BACKGROUND ART

Figure 9:
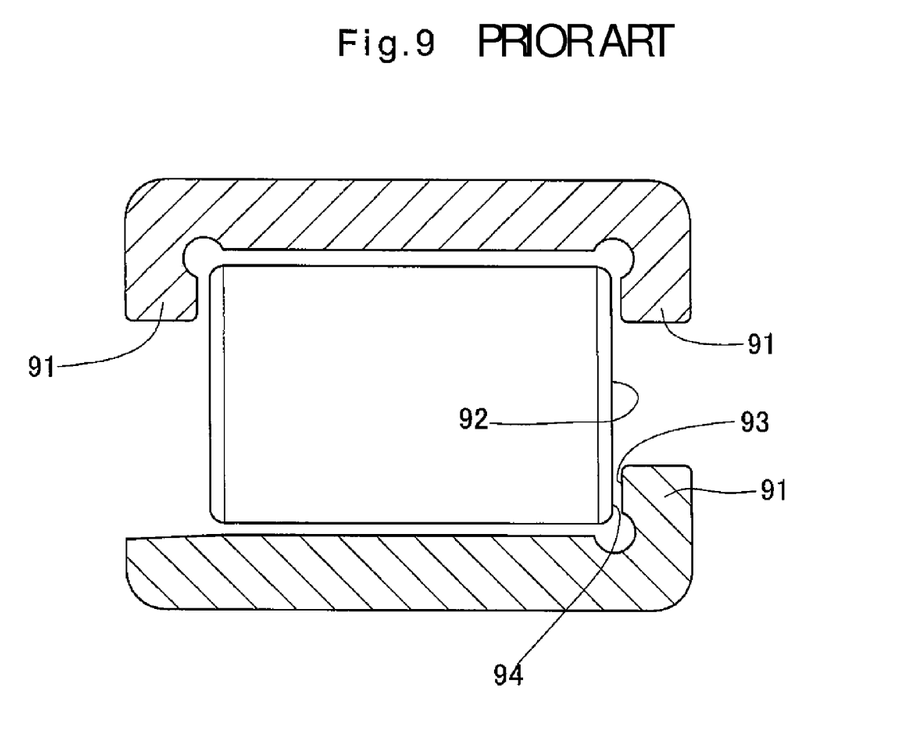
FIG. 9 is a sectional view of a conventional cylindrical roller bearing.

As one of this type of roller bearings, FIG. 9 shows a standard cylindrical roller bearing. In this bearing, flanges 91 and a roller end surface 92 have flat surface portions 93 and 94, respectively, which both extend perpendicular to the roller center axis and are configured to be brought into contact with each other. With this arrangement, when large thrust loads are applied to the bearing, since no gaps are present between the flat surface portions 93 and 94, lubricant cannot flow into between the flat surface portions, which could lead to overheating or seizure.

In order to improve the thrust load capacity of a bearing, it is necessary to prevent overheating and seizure due to excessive contact surface pressure between the roller end surfaces and the flanges while thrust loads are being applied. For this purpose, it is known to suitably determine the shapes of the surfaces of the flanges and the roller end surfaces so as to adjust the position and size of contact ovals (see JP Patent Publication 2002-195272A (especially paragraphs [0008], [0012] and [0014] of the specification)).

In particular, the roller end surface has an annular guided surface portion which can contact a flange while the roller is orbiting, wherein the annular guided surface portion is inclined obliquely, in the thrust direction toward the longitudinal center of the roller, from its edge near the roller center axis to its edge near the raceway such that the circumference of the annular guided surface portion whose center lies on the roller center axis is small. The flange has an annular guiding surface which can contact the annular guided surface portion, wherein the annular guiding surface is inclined obliquely outwardly of the bearing with respect to the thrust direction, from its edge near the raceway to its edge near the roller center axis such that the circumference of the annular guiding surface whose center lies on the bearing center axis changes. With this arrangement, since the annular guided surface portion of the roller end surface and the annular guiding surface of the flange are inclined, the annular guided surface portion and the annular guiding surface are brought into point contact or line contact with each other, so that a gap forms between these surfaces, allowing lubricant to flow smoothly into between these surfaces. This in turn prevents overheating and seizure, thus improving the thrust load capacity of the bearing.

In the bearing disclosed in JP Patent Publication 2002-195272A, the entire annular guided surface portion of the roller end surface is formed with crowning having a center of curvature located on the roller axis (whose radius of curvature is about 25 to 100 times the diameter of the roller). The crowning prevents excessive edge loads from being generated between the contact portions of the annular guided surface portion of the roller end surface and the annular guiding surface of the flange. By the combination of the radius of curvature and an acute inclination angle (about 0.15 to 0.65°) of the flange relative to the direction perpendicular to the roller center axis, it is possible to adjust the position and size of the contact oval.

In the above arrangement, although lubricant can flow smoothly, since it is necessary to operate the bearing while keeping the contact surface pressure between the annular guided surface portion of the roller end surface and the annular guiding surface of the flange within such a range that an oil film is present therebetween, there is a limit to the ability to support thrust loads. Particularly in the arrangement of JP Patent Publication 2002-195272A, in which the annular guided surface portion of the roller and the annular guiding surface of the flange are shaped such that they are brought into point contact with each other, the maximum contact surface pressure tends to be much higher than with standard bearings, so that the upper limit of the thrust load capacity of this bearing is low.

SUMMARY OF THE INVENTION

An object of the present invention is to improve the oil film forming ability at the contact portion between the roller end surface and the flange, of a bearing of the type in which thrust loads are received by the flange.

According to this invention, this object is achieved in a roller bearing wherein a roller has an end surface having an annular guided surface portion which can contact a flange, wherein the annular guided surface portion is inclined obliquely, with respect to the direction perpendicular to the center axis of the roller, in the thrust direction toward the longitudinal center of the roller, from its edge near the roller center axis to its edge near the raceway such that the circumference of the annular guided surface portion whose center lies on the roller center axis is small, wherein the flange has an annular guiding surface which can contact the annular guided surface portion, wherein the annular guiding surface is inclined obliquely with respect to the radial direction and outwardly of the bearing with respect to the thrust direction, from its edge near the raceway to its edge near the roller center axis such that the circumference of the annular guiding surface whose center lies on the bearing center axis changes, and wherein the flange can receive thrust loads. As described above, with this arrangement, lubricant can smoothly flow into the contact portion between the roller end surface and the flange. As used herein, the "thrust" direction refers to the direction parallel to the bearing center axis.

When the annular guided surface portion of the roller is guided by the annular guiding surface of the flange in the circumferential direction about the bearing center axis, the annular guided surface portion and the annular guiding surface are in rolling contact and sliding contact at a high contact surface pressure. Thus, it is possible to calculate the oil film thickness at any radial position of the contact portion between the annular guided surface portion and the annular guiding surface by numerical analysis based on the elastohydrodynamic lubrication (EHL) theory. The inventor tried to discover a combination of a flange angle and a roller end surface angle which leads to the formation of a satisfactory oil film by the above numerical analysis, in which the flange angle and the roller end surface angle are an acute angle between a radial straight line and a straight line passing through the edges of the annular guiding surface, and an acute angle between a radial straight line and a straight line passing through the edges of the annular guided surface portions, on the plane including the bearing center axis and the roller center axis of the roller. The "radial" direction refers to a direction perpendicular to the bearing center axis.

As a result, according to the present invention, the flange angle and the roller end surface angle are both set to be not less than 0.1° and not more than 1.5° over the entire circumferences of the annular guiding surface and the annular guided surface portion. With this arrangement, a satisfactory oil film forms at 70% or more of the radial range where the annular guiding surface can contact the annular guided surface portion in the thrust direction. If one of the flange angle and the roller end surface angle is less than 0.1°, no satisfactory oil film may form. If one of the flange angle and the roller end surface angle is larger than 1.5°, the projected areas of the annular guiding surface and the annular guided surface portions in the thrust direction decrease, which in turn increases the load per unit width and the oil film forming ability, thus increasing the thrust load capacity and the amount of material that has to be removed.

The difference between the flange angle and the roller end surface angle is preferably not less than −0.2° and not more than +0.3°. With this arrangement, irrespective of whether these angles are the same or different from each other, a satisfactory oil film forms at 70% or more of the radial range.

It is particularly preferable that the difference between the flange angle and the roller end surface angle is zero degrees. With this arrangement, the annular guided surface portion and the annular guiding surface are shaped such that they can be brought into line contact with each other over the entire radial range thereof. This improves the thrust load capacity compared to bearings in which the annular guided surface portion and the annular guiding surface are brought into point contact with each other.

Preferably, each of the annular guided surface portion and the annular guiding surface extend in a straight line on any plane including the center axis of the bearing. With this arrangement, since the annular guided surface portion and the annular guiding surface are both simple conical surfaces, the difference between the flange angle and the roller end surface angle can be set easily.

Preferably, at least one of the annular guided surface portion and the annular guiding surface is formed with crowning. With this arrangement, edge loads decrease, so that it is possible to reduce galling of the annular guided surface portion and the annular guiding surface when the roller is skewed or tilted.

Preferably, the end surface of the roller has a central portion formed with a grinding undercut. Such an undercut reduces the number of steps for forming the roller end surface, and thus the cost. Also, the end surface central portion serves as an oil reservoir, thus improving lubrication of the contact portions of the annular guided surface portion and the annular guiding surface.

Preferably, the end surface of the roller has an intermediate annular portion extending parallel to a plane perpendicular to the roller center axis, between the annular guided surface portion and the central portion. With this arrangement, the length of the roller can be measured and controlled easily with reference to the intermediate annular portion.

This roller bearing may be configured such that a first flange is provided on an inner race and a second flange is provided on an outer race, the first flange has a first annular guiding surface which can contact the end surface of the roller and which has edges, the first annular guiding surface has a first angle which is not less than 0° and not more than 90° and formed between a radial straight line and the straight line passing through the edges of the first annular guiding surface, on the plane including the center axis of the bearing and the center axis of the roller, the second flange has a second annular guiding surface which can contact the end surface of the roller and which has edges, the second annular guiding surface has a second angle which is not less than 0° and not more than 90° and formed between a radial straight line and the straight line passing through the edges of the second annular guiding surface, at least one of the first and second angles is the flange angle, and the first and second angles differ from each other.

This invention is especially advantageously applicable to a cylindrical roller bearing, of which the roller is a cylindrical roller.

With the above-described arrangement, in the roller bearing according to the present invention, of which a flange can receive thrust loads, an oil film forming ability improves between the annular guided surface portion and the annular guiding surface, where the roller end surface contacts the flange.

DETAILED DESCRIPTION OF THE INVENTION

Figure 1A:
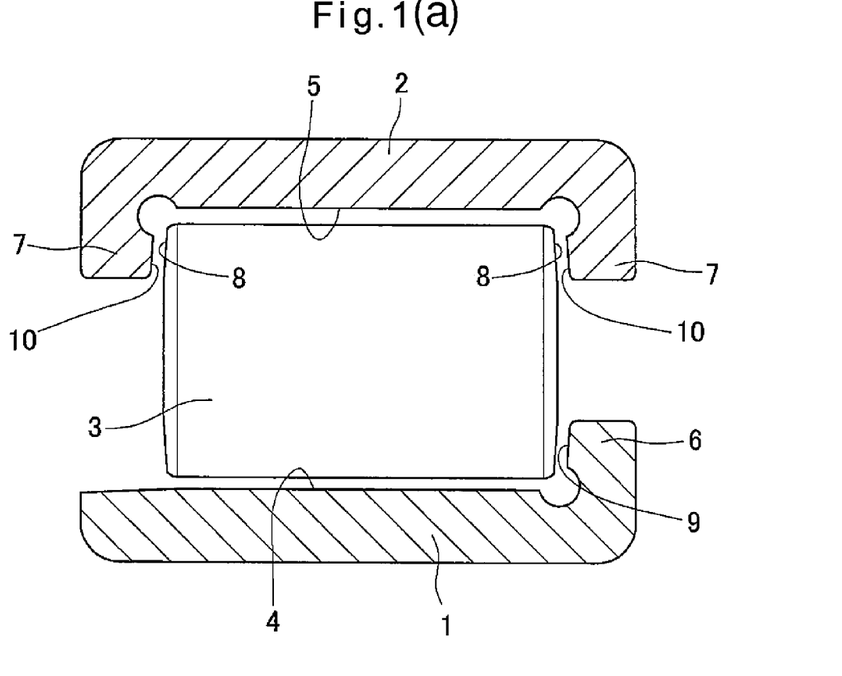
FIG. 1(a) is a sectional view of a roller bearing according to a first embodiment of the present invention.

A roller bearing (hereinafter simply referred to as the "bearing") according to a first embodiment of the present invention is described with reference to the drawings. As shown in FIG. 1(a), this bearing includes an inner race 1, an outer race 2, and a plurality of rollers 3.

The inner race 1 is an annular member formed with a raceway 4 and a first flange 6. The outer race 2 is an annular member formed with a raceway 5 and second flanges 7. The first flange 6 and the second flanges 7 are hereinafter simply referred to as the "flange 6" and the "flanges 7", respectively. The flanges 6 and 7 may comprise flange rings.

The rollers 3 are cylindrical rollers.

A thrust load applied rightwardly in FIG. 1 to the bearing can be received by the flange 6, which is on one side of the inner raceway 4, and the right-hand one of the flanges 7, which are on both sides of the outer raceway 5. A thrust load applied leftwardly in FIG. 1 to the bearing can be received by the left-hand one of the flanges 7.

Figure 1B:
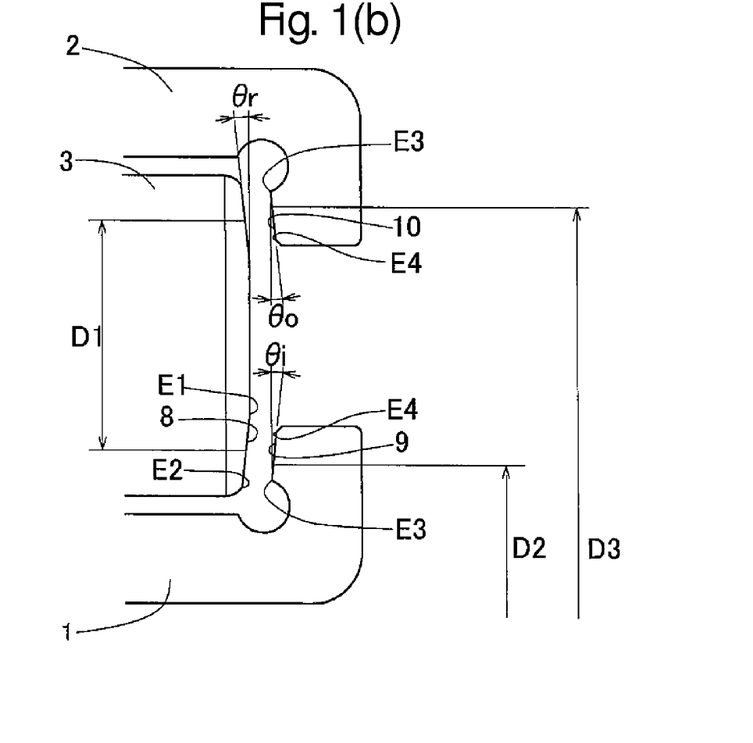
FIG. 1(b) is a conceptual view of the first embodiment, showing a flange angle and a roller end surface angle.

FIGS. 1(a) and 1(b) are sections of the bearing taken along the plane including the center axis of the bearing and the center axis of one of the rollers, with the roller 3 neither skewed nor tilted and with the end surfaces of the roller 3 facing the flanges 6 and 7 through oil film disposed therebetween. In these figures, the gaps between the end surfaces of the roller 3 and the flanges 6 and 7 are shown in an exaggerated manner.

The flanges 6 and 7 have annular guiding surfaces 9 and 10, respectively, which are annular side surfaces of the flanges 6 and 7 whose centers lie on the axis of the bearing. The roller 3 has annular guided surface portions 8, which are portions of the end surfaces of the roller 3 whose centers lie on the center axis of the bearing. The annular guided surface portions 8 can be brought into contact with the annular guiding surfaces 9 and 10 in the thrust direction while the roller 3 is rolling around the center axis of the bearing between the raceways 4 and 5.

The annular guided surface portions 8, which are portions of the end surfaces of the roller 3 and can be brought into contact with the flanges 6 and 7, are each inclined obliquely, with respect to the direction perpendicular to the center axis of the roller, in the thrust direction toward the longitudinal center of the roller, from its edge E1 near the center axis of the roller to its edge E2 near the raceways 4 and 5, such that the diameter D1 (shown in FIG. 1(b)) of its circumference, whose center lies on the center axis of the roller, is small.

The annular guided surface portions 8 each extend in a straight line on any plane including the center axis of the bearing. That is, each of the annular guided surface portions 8 is a single conical surface whose center lies on the center axis of the roller.

The annular guiding surfaces 9 and 10 of the flanges 6 and 7, which can contact the annular guided surface portions 8, are each inclined obliquely with respect to the radial direction and outwardly of the bearing with respect to the thrust direction, from its edge E3 near the raceway 4 or 5 to its edge E4 near the center axis of the roller, such that the diameter (D2 or D3) of its circumference, whose center lies on the center axis of the bearing, changes. That is, the flange 6 of the inner race 1 is shaped such that the diameter D2 increases, while the flanges 7 of the outer race 2 are shaped such that the diameter D3 decreases.

The annular guiding surfaces 9 and 10 each extend in a straight line on any plane including the center axis of the bearing. That is, each of the annular guiding surfaces 9 and 10 is a single conical surface whose center lies on the center axis of the bearing.

As used herein, "θi" refers to the angle of the straight line connecting the edges E3 and E4 of the annular guiding surface 9 of the flange 6 relative to the radial direction, which is 0° or over and 90° or less. If the angle θi is an acute angle, this angle is referred to as "flange angle θi". "θo" refers to the angle of the straight line connecting the edges E3 and E4 of the annular guiding surface 10 of each flange 7 relative to the radial direction, which is 0° or over and 90° or less. If the angle θo is an acute angle, this angle is referred to as "flange angle θo". The angle between the radial line and the line connecting the edges E1 and E2, which is an acute angle, is referred to as "roller end surface angle θr".

Equation 1 below is known as Dowson-Higginson equation, which is used to calculate an oil film thickness during line contact of elastohydrodynamic lubrication theory. Based on this equation, optimum ranges of the flange angles θi and θo and roller end surface angle θr were considered. In particular, oil film thicknesses were calculated between the contact portions of the roller 3 and the respective flanges 6 and 7 (between the annular guided surface portions 8 and the annular guiding surfaces 10) to estimate the radial distribution of oil film thicknesses.

$$\frac{h_{min}}{R} = 2.65 \left(\frac{\eta_0 \bar{u}}{ER}\right)^{0.7} (\alpha E)^{0.54} \left(\frac{w}{ER}\right)^{-0.13} \quad \text{[Equation 1]}$$

where
$h_{min}$ is the minimum oil film thickness;
$\eta_0$ is the viscosity under the atmospheric pressure;
$\bar{u}$ is the average rolling speed;
$\alpha$ is the viscosity-pressure coefficient;
w is the load per unit width;
R is the equivalent radius of curvature; and
E is the modulus of longitudinal elasticity.

Figure 2:
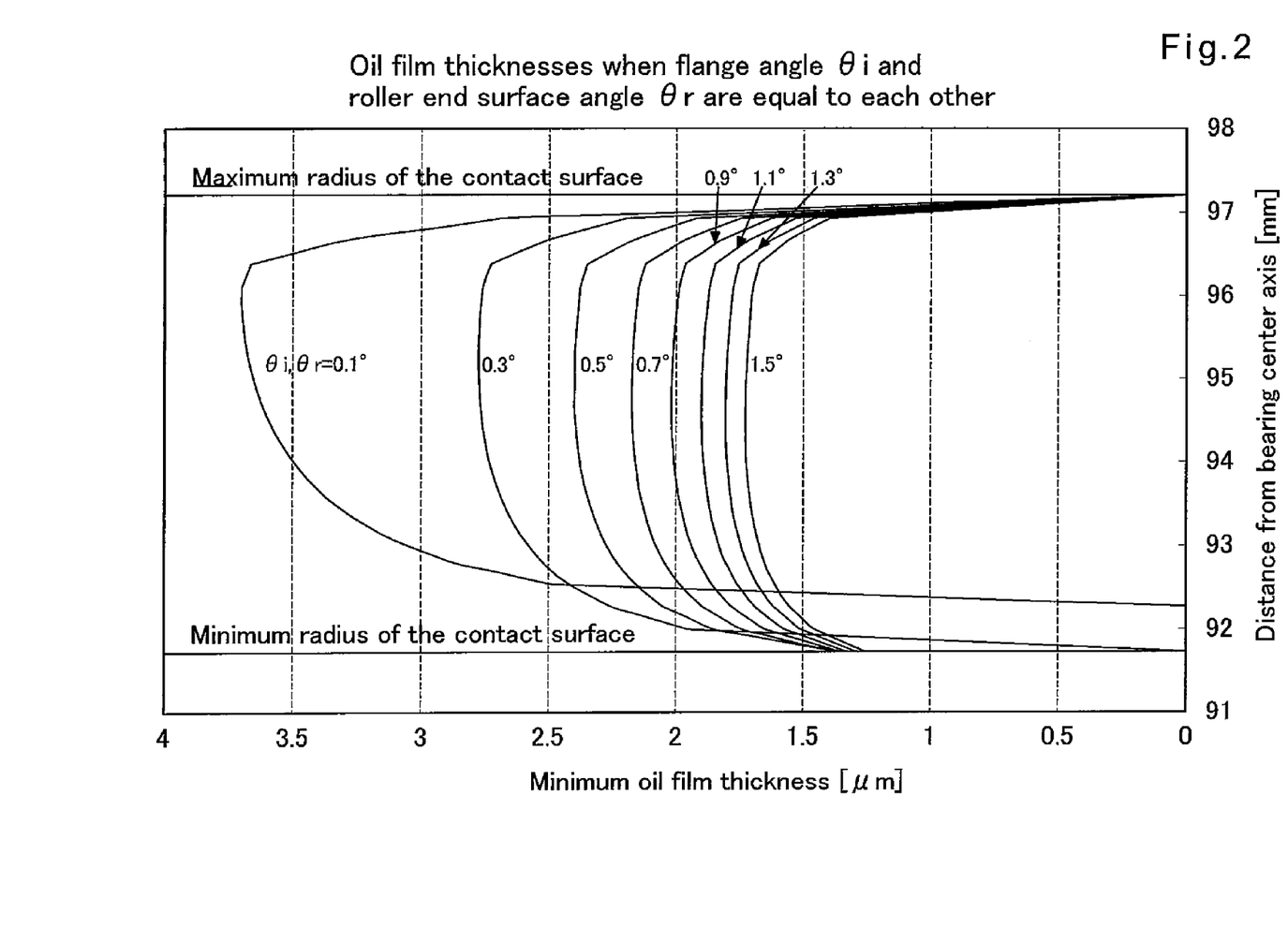
FIG. 2 is a graph showing calculation results of oil film thicknesses when the flange angle and the roller end surface angle are changed to various values with the flange angle and the roller end surface kept equal to each other.
Figure 3:
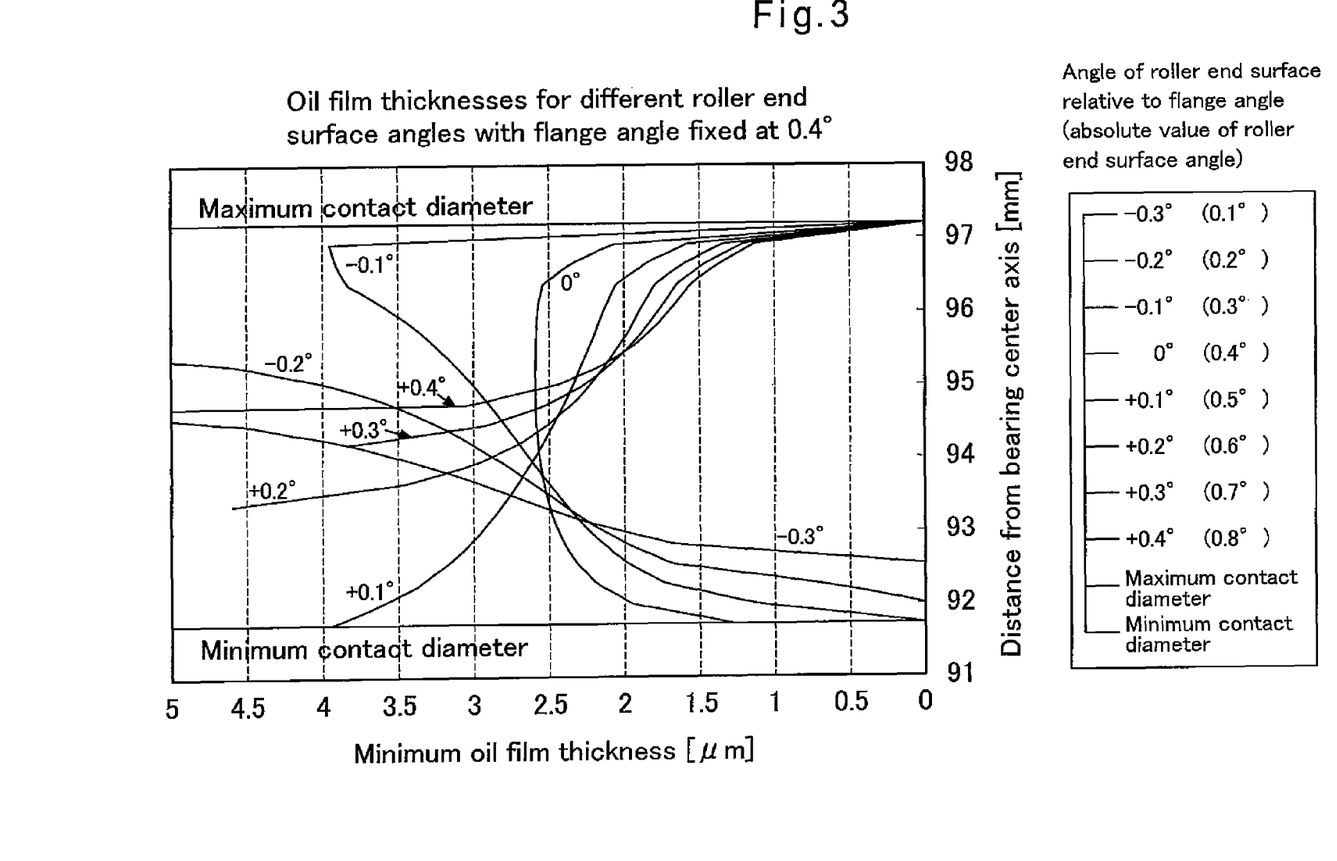
FIG. 3 is a graph showing calculation results of oil film thicknesses for various roller end surface angles with the flange angle set at 0.4°.
Figure 4:
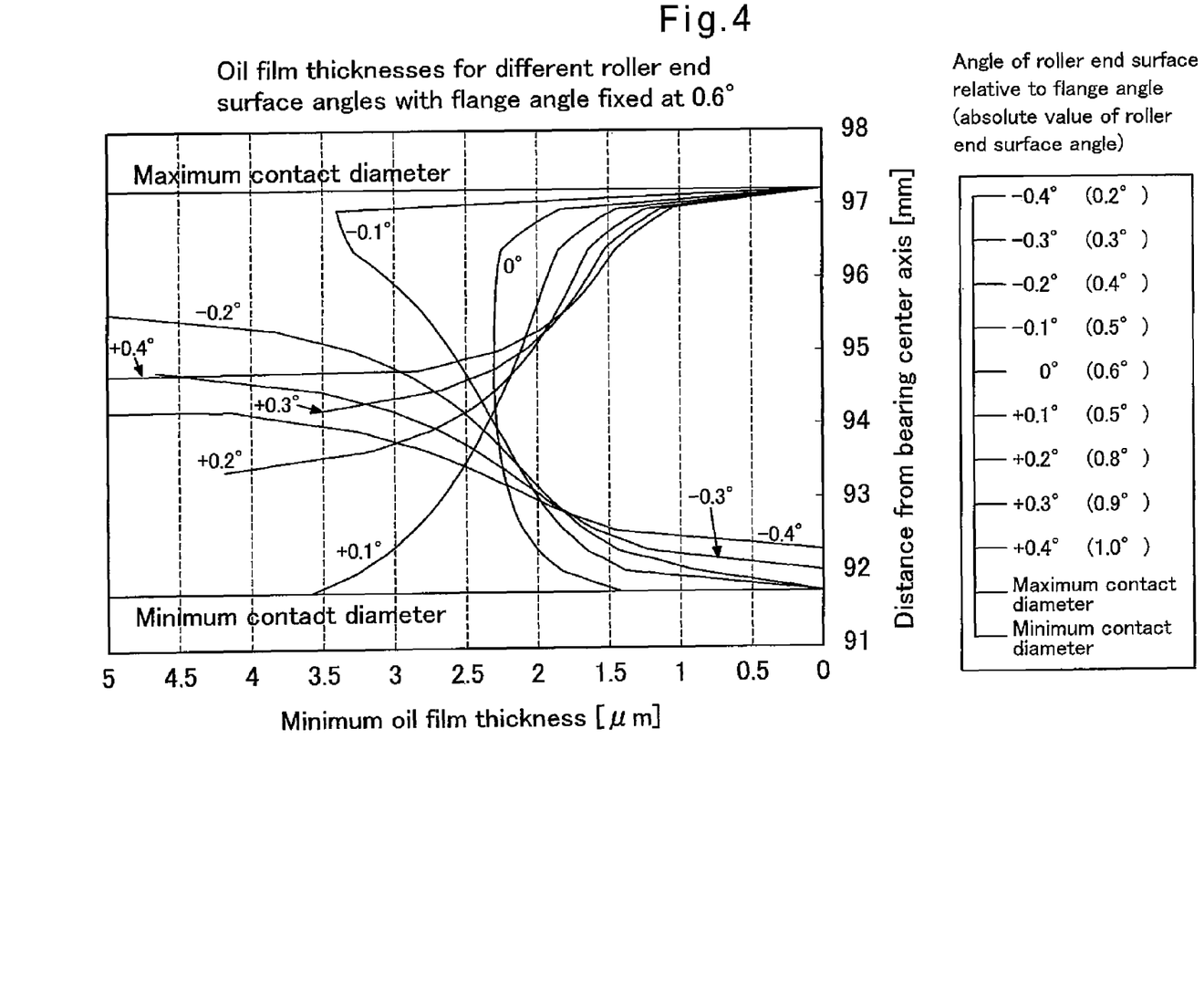
FIG. 4 is a graph showing calculation results of oil film thicknesses for various roller end surface angles with the flange angle set at 0.6°.
Figure 5:
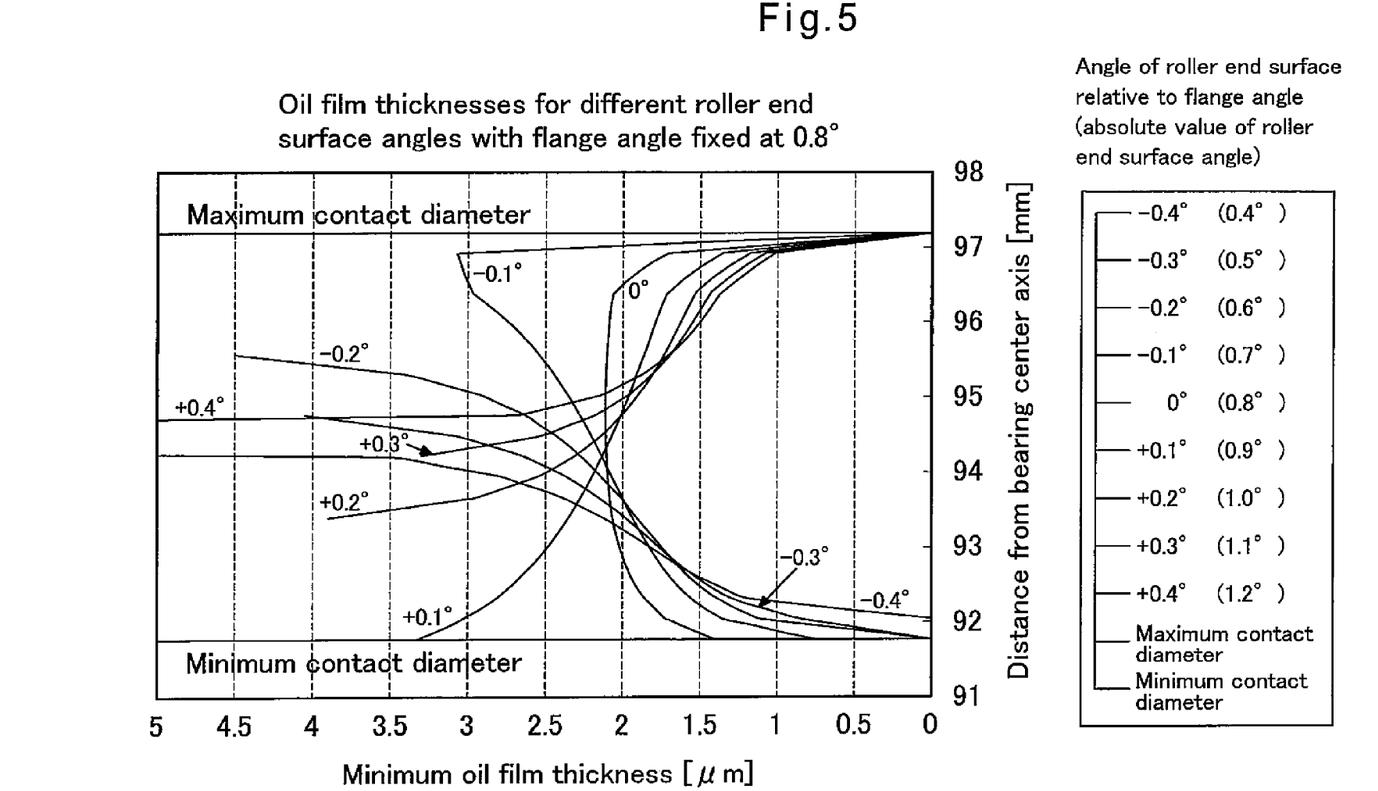
FIG. 5 is a graph showing calculation results of oil film thicknesses for various roller end surface angles with the flange angle set at 0.8°.

FIG. 2 shows the calculation results where the flange angle θi is equal to the roller end surface angle θr. FIGS. 3 to 5 show the calculation results where the flange angle θi differs from the roller end surface angle θr. These calculation models are based on the assumption that the bearing measures 140 mm in inner diameter, 300 mm in outer diameter and 102 mm wide, and a thrust load of about 1650 [N] is applied to the bearing.

The limits of the radial range within which the annular guiding surface 9 of FIG. 1 can contact the annular guided surface portions 8 while the rollers are orbiting are determined by the positions of the edges E3 and E4 of the annular guided surface portion 8, irrespective of the contact length of the surfaces 9 and 8, tilt of the roller 3, or existence or non-existence of skew. Thus, in the respective calculation models of FIG. 2, where the annular guiding surface 9 is in line contact with the annular guided surface portion 8 because the flange angle θi and roller end surface angle θr are equal to each other, and where the angles θi and θr are within the range of 0.1 to 1.5°, the radiuses (r1 and r2) of the inner and outer limit positions of the contact surface with respect to the radial direction of the bearing correspond to the radiuses of the respective (circular) edges E3 and E4. In the respective calculation models of FIGS. 3 to 5 too, where the annular guiding surface 9 is in line contact with the annular guided surface portion 8 because the flange angle θi and roller end surface angle θr (of FIG. 1(b)) differ from each other, so that due to tilting of the roller, the contact position of the roller on the annular guiding surface 9 changes to a relatively large extent in the radial direction, and where θi=0.4° and θr=0.1 to 0.8° in FIG. 3, θi=0.6° and θr=0.2 to 1.0° in FIG. 4, and θi=0.8° and θr=0.4 to 1.2° in FIG. 5, the radiuses (r3 and r4) of the inner and outer limit positions of the contact surface with respect to the radial direction of the bearing correspond to the radiuses of the respective (circular) edges E3 and E4.

If the oil film parameter Λ of the below Equation 2, which is based on the relationship between the oil film thickness and the surface roughness, is 3 or larger, lubrication is considered to be sufficient with a sufficient oil film formed. If the annular guided surface portions and the annular guiding surfaces of a bearing have ordinary surface roughness, and the minimum oil film thickness is 1.5 μm, the parameter Λ will be 3 or over.

$$\Lambda = \frac{h_{min}}{\sqrt{\sigma_1^2 + \sigma_2^2}} \quad \text{[Equation 2]}$$

where:
$h_{min}$ is a minimum oil film thickness; and
$\sigma_1$ and $\sigma_2$ are average surface roughness values of two objects.

From the oil film thickness distributions in the calculation models shown in FIG. 2, it is apparent that the oil film thickness is 1.5 μm or larger at 70% or more of the radial range (r2)-(r1), where the roller end surface can contact the flange. This in turn indicates that if the flange angle $\theta i$ and the roller end surface angle $\theta r$ (shown in FIG. 1) are equal to each other, oil film forms satisfactorily between the annular guiding surface 9 and the annular guided surface portion 8, provided the angles $\theta i$ and $\theta r$ are not less than 0.1° and not more than 1.5°.

From the oil film thickness distributions in the calculation models shown in FIGS. 3 to 5, where the flange angle $\theta i$ differs from the roller end surface angle $\theta r$, it is apparent that for the calculation models where the difference between the flange angle $\theta i$ and the roller end surface angle $\theta r$ (relative angle) is not less than −0.2° and not more than +0.3°, the oil film thickness is 1.5 μm or larger at 70% or more of the radial range (r4)-(r3), where the roller end surface can contact the flange. This indicates that even if the flange angle $\theta i$ and the roller end surface angle $\theta r$ (shown in FIG. 1) differ from each other, oil film forms satisfactorily between the annular guiding surface 9 and the annular guided surface portion 8, provided the difference between the flange angle $\theta i$ and the roller end surface angle $\theta r$ is not less than −0.2° and not more than +0.3°.

Similar oil film distributions are also obtained for the combination of the flange angle $\theta o$ of the flange 7 and the roller end surface angle $\theta r$. Thus, considering the above results of analysis, the flange angles $\theta i$ and $\theta o$ and the roller end surface angle $\theta r$ are preferably set at not less than 0.1° and not more than 1.5° over the entire circumference of each of the annular guiding surfaces 9 and 10 and the annular guided surface portion 8. If at least one of the roller end surface angle $\theta r$ and the flange angle $\theta i$, $\theta o$ is less than 0.1°, no satisfactory oil film may form. If at least one of the roller end surface angle $\theta r$ and the flange angle $\theta i$, $\theta o$ is larger than 1.5°, no satisfactory oil film may form either, because the areas of the annular guided surface portions 8 and the annular guiding surfaces 9 and 10 as projected in the thrust direction decrease and as a result, the load per unit width increases. This could in turn reduce the ability of the bearing to receive thrust loads. Also, it is necessary to remove impractically large amounts of material to form a bearing.

Further, the difference between the flange angle $\theta i$, $\theta o$ and the roller end surface angle $\theta r$ is preferably not less than −0.2° and not more than +0.3°, because with this arrangement, irrespective of whether the flange angle $\theta i$, $\theta o$ is equal to or differs from the roller end surface angle $\theta r$, a satisfactory oil film forms at 70% or more of the radial range where the annular guided surface portions 8 can contact the annular guiding surfaces 9 and 10.

Still further, in order to maximize the line contact length between the annular guiding surfaces 9 and 10 and the annular guided surface portions 8, and thereby to maximize the thrust load capacity, the flange angle $\theta i$, $\theta o$ and the roller end surface angle $\theta r$ are preferably equal to each other, that is, the difference between the flange angle $\theta i$, $\theta o$ and the roller end surface angle $\theta r$ is preferably zero degrees. Especially by forming, as in FIG. 1(b), each of the annular guiding surfaces 9 and 10 and the annular guided surface portions 8 so as to extend radially in straight lines inclined at the same inclination angle over the entire circumference thereof, it is possible to most effectively increase the line contact length.

In a bearing having a flange 6 on the inner race 1 and having flanges 7 on the outer race 2 (see FIG. 1(a)), if at least one of the flange angles $\theta i$ and $\theta o$ is determined in the above-described manner, the angles $\theta i$ and $\theta o$ may be different from each other. According to the magnitude of thrust loads, whether the inner race is rotated or the outer race is rotated, and how lubricant is fed, the oil film forming ability and the necessary oil film thickness differ between the inner race 1 and the outer race 2. The flange angles $\theta i$ and $\theta o$ may be determined so as to satisfy the above-mentioned conditions only if lubrication is thin. Thus, the angles $\theta i$ and $\theta o$ may not necessarily have to be equal to each other. Under favorable lubricating conditions, one of the flange angles $\theta i$ and $\theta o$ may be set at zero degrees. The flange angles $\theta i$ and $\theta o$ may be determined at different values so that one of the bearing parts (inner race 1 or outer race 2) of a conventional bearing can be used in the bearing according to the present invention. For example, the bearing shown in FIG. 9 includes a conventional inner race or a conventional outer race, which has a flat annular surface extending parallel to a radial plane and thus having a flange angle $\theta i$ or $\theta o$ of zero degrees.

Figure 6:
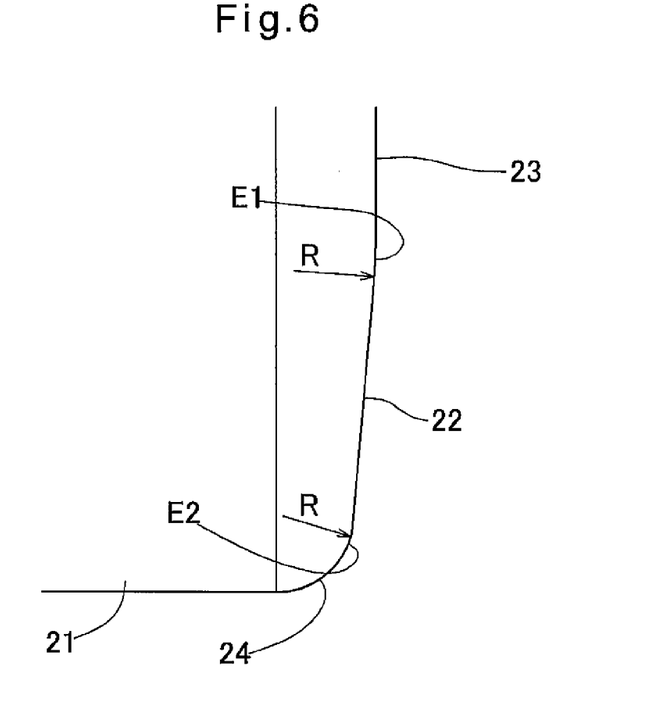
FIG. 6 is a partial sectional view of a roller according to a second embodiment.

FIG. 6 shows the second embodiment. What differs from the first embodiment is described below. The second embodiment differs from the first embodiment in that the annular guided surface portions 22 of the roller 21 are each formed with crowning. The annular guided surface portion 22 is connected to an end surface central portion 23 extending parallel to a plane perpendicular to the roller center axis through the edge E1, and is connected to a radially outer chamfer 24 through the edge E2. When a thrust load is applied, edge loads are generated between the edges E1 and E2 and the portions of the annular guiding surfaces 9 and 10 (see also FIGS. 1(a) and 1(b)) that are in contact with the edges E1 and E2. The annular guiding surfaces 9 and 10 are each connected to a grinding undercut through the edge E3, and connected to a flange radial surface chamfer through the edge E4. Edge loads are also generated between the edges E3 and E4 and the portions of the annular guided surface portion 22 that are in contact with the edges E3 and E4. By providing the annular guided surface portion 22 and/or the annular guiding surfaces 9 and 10 with crowning, it is possible to reduce the above-described edge loads. The crowning also makes it possible for the annular guided surface portion 22 to more easily slide on the annular guiding surfaces 9 and 10 when the roller 21 is skewed or tilted. This reduces galling.

By forming crowning, the annular guided surface portion 22 and the annular guiding surfaces 9 and 10 is displaced from any straight line connecting the edges E1 and E2 or connecting the edges E3 and E4. Even if such displacement is slight, it is possible to effectively reduce stress. Thus, the crowning improves the oil film forming ability to substantially the same extent as when the roller end surface angle $\theta r$ differs from the flange angles $\theta i$ and $\theta o$ as described above.

The shape of crowning is not particularly limited. For example, as shown in FIG. 6, the crowning may be in the form of a circular arc-shaped surface, composite straight surfaces, or a combination thereof that are formed on each of the edges of the annular guided surface portion 22 and/or the annular guiding surfaces 9 and 10. Alternatively, as shown in FIG. 9, crowning may be formed on the entire annular guided surface portion 22 and/or on the entire annular guiding surfaces 9 and 10. In this case too, the crowning may be in the form of a circular arc-shaped surface, composite straight surfaces, or a combination thereof.

Figure 7:
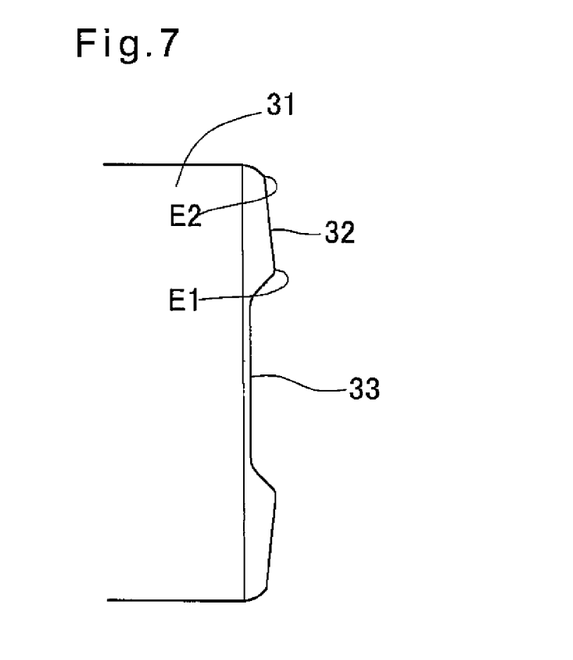
FIG. 7 is a partial sectional view of a roller according to a third embodiment.

FIG. 7 shows the third embodiment, which differs from the first embodiment in that the end surface of the roller 31 has a grinding undercut formed in the end surface central portion 33 surrounded by the edge E1 of the annular guided surface portion 32, which is located near the roller center axis. The grinding undercut reduces the number of steps for forming the roller end surface, and thus the cost. Also, since the end surface central portion 33 serves as an oil reservoir, lubricant flows into the space between the annular guided surface portion 32 and the annular guiding surfaces 9 and 10, thus improving lubrication of the contact portions of these surfaces.

The relationship between the diametric ratios of the end surface central portion 33 and the annular guided surface portion 32, relative to the diameter of the roller, and the annular guiding surfaces 9 and 10 should be suitably determined taking into consideration the thrust load capacity and lubricating properties. For example, in order to prevent the end surface central portion 33 from facing the annular guiding surfaces 9 and 10 in the thrust direction, the diameter of the end surface central portion 33 may be set at less than half the diameter of the roller 31, and the radial widths of the annular guiding surfaces 9 and 10 from the raceways 4 and 5 may be set at less than 15% of the diameter of the roller 31. Alternatively, as disclosed in JP Patent Publication 2002-195272A, the diameter of the end surface central portion 33 may be set at not less than 50% and not more than 80%, of the diameter of the roller 31, and the radial widths of the annular guiding surfaces 9 and 10 from the raceways 4 and 5 may be set at not less than 15% and not more than 25%, of the diameter of the roller 31 so as to prevent the contact oval from protruding from the annular guiding surfaces 9 and 10, while maximizing the radial contact range between the annular guided surface portion 32 and the annular guiding surfaces 9 and 10.

Figure 8:
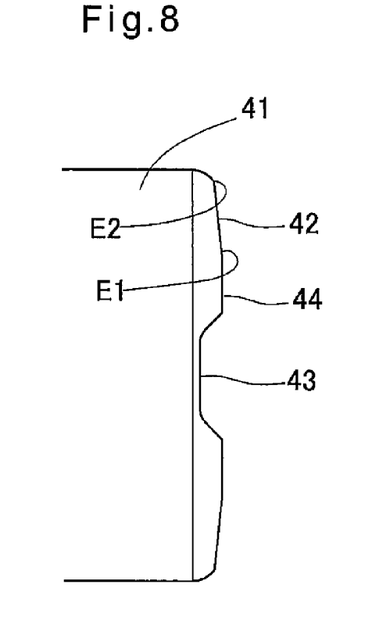
FIG. 8 is a partial sectional view of a roller according to a fourth embodiment.

FIG. 8 shows the fourth embodiment, which is a modification of the third embodiment, and differs therefrom in that an intermediate annular portion 44 is formed between the annular guided surface portion 42 and the end surface central portion 43, of each end surface of the roller 41 so as to extend parallel to a plane perpendicular to the roller center axis. With this arrangement, since the length of the roller 41 can be measured with reference to the surface portions whose axial positions are uniform (end surface central portion 43), the length of the roller 41 can be measured and controlled more easily than when the length of the roller 41 is measured with reference to linear portions shown in FIG. 7 (edges E1 of the annular guided surface portions 32).

The present invention includes all modifications covered by the claims.

What is claimed is:

1. A roller bearing comprising a roller having an end surface, a flange, and a raceway, wherein the end surface includes an annular guided surface which can contact the flange, and the flange is formed with an annular guiding surface which can contact the annular guided surface portion, whereby the flange can receive a thrust load,
   wherein the annular guided surface portion is inclined obliquely, with respect to a direction perpendicular to a center axis of the roller, in a thrust direction toward a longitudinal center of the roller, from a first edge of the annular guided surface portion near the center axis of the roller to a second edge of the annular guided surface portion near the raceway,
   wherein the annular guiding surface is inclined obliquely with respect to a radial direction and outwardly of the bearing with respect to the thrust direction, from a third edge of the annular guiding surface near the raceway to a fourth edge of the annular guiding surface near the center axis of the roller, whereby a circumference of the annular guiding surface whose center lies on a center axis of the bearing changes,
   wherein the annular guiding surface has a flange angle which is an acute angle between a radial straight line and a straight line passing through the third and fourth edges, on a plane including the center axis of the bearing and the center axis of the roller, and the annular guided surface portion has a roller end surface angle which is an acute angle between a radial straight line and a straight line passing through the first and second edges, on the plane including the center axis of the bearing and the center axis of the roller, wherein the flange angle and the roller end surface angle are both not less than 0.1° and not more than 1.5° over the entire circumferences of the annular guiding surface and the annular guided surface portion, respectively.

2. The roller bearing of claim 1, wherein a difference between the flange angle and the roller end surface angle is not less than −0.2° and not more than +0.3°.

3. The roller bearing of claim 2, wherein a difference between the flange angle and the roller end surface angle is zero degrees.

4. The roller bearing of claim 2, wherein each of the annular guided surface portion and the annular guiding surface extend in a straight line on any plane including the center axis of the bearing.

5. The roller bearing of claim 1, wherein at least one of the annular guided surface portion and the annular guiding surface is formed with crowning.

6. The roller bearing of claim 1, wherein the end surface of the roller has a central portion formed with a grinding undercut.

7. The roller bearing of claim 6, wherein the end surface of the roller has an intermediate annular portion extending parallel to a plane perpendicular to the center axis of the roller, between the annular guided surface portion and the central portion.

8. The roller bearing of claim 1, wherein the roller is a cylindrical roller.

9. The roller bearing of claim 1, further comprising an inner race and an outer race,
   wherein said flange is a first flange formed on one of the inner race and the outer race; and said raceway is a first raceway formed on said one of the inner race and the outer race,
   wherein the other of the inner race and the outer race has a second flange and a second raceway,
   wherein the second flange has an annular guiding surface which can contact the annular guided surface portion,
   wherein the annular guiding surface of the second flange is inclined obliquely with respect to a radial direction and outwardly of the bearing with respect to the thrust direction, from a third edge of the annular guiding surface of the second flange near the second raceway to a fourth edge of the annular guiding surface of the second flange near the center axis of the roller, whereby a circumference of the annular guiding surface of the second flange whose center lies on a center axis of the bearing changes, and
   wherein the second flange can receive thrust loads,
   wherein the annular guiding surface of the second flange has a flange angle which is an acute angle between a radial straight line and a straight line passing through the third and fourth edges of the second flange, on a plane including the center axis of the bearing and the center axis of the roller, and
   wherein the flange angle of the annular guiding surface of the first flange differs from the flange angle of the annular guiding surface of the second flange.

* * * * *